United States Patent
Chen

(10) Patent No.: US 8,175,138 B2
(45) Date of Patent: May 8, 2012

(54) POWER EFFICIENT FHSS BASE-BAND HARDWARE ARCHITECTURE

(75) Inventor: Wei-Teng Chen, Hacienda Heights, CA (US)

(73) Assignee: Kylink Communications Corp., Zhung-He (TW)

( * ) Notice: Subject to any disclaimer, the term of this patent is extended or adjusted under 35 U.S.C. 154(b) by 0 days.

(21) Appl. No.: 12/071,168

(22) Filed: Feb. 15, 2008

(65) Prior Publication Data
US 2011/0222587 A1 Sep. 15, 2011

(51) Int. Cl.
*H04B 13/02* (2006.01)
(52) U.S. Cl. ........ 375/219; 375/316; 375/220; 345/467; 345/211; 455/404.2; 455/456.1
(58) Field of Classification Search .................. 375/219, 375/220, 316; 345/211, 467; 455/404.2, 455/456.1
See application file for complete search history.

(56) References Cited

U.S. PATENT DOCUMENTS

| | | | | |
|---|---|---|---|---|
| 5,724,067 A | * | 3/1998 | Atchley et al. | 345/467 |
| 7,546,624 B2 | * | 6/2009 | Vishloff et al. | 725/62 |
| 2009/0138638 A1 | * | 5/2009 | Russo et al. | 710/106 |
| 2010/0156876 A1 | * | 6/2010 | Yokota et al. | 345/211 |

* cited by examiner

*Primary Examiner* — Eva Puente
(74) *Attorney, Agent, or Firm* — Rabin & Berdo, P.C.

(57) ABSTRACT

The present invention provides a power efficient FHSS (Frequency Hopping Spreading Spectrum) base-band hardware architecture, and more particularly to a combinational design to reduce the system jitter of a frequency hopping communication system and bring system synchronization to higher level of performance, thereby achieving better immunity to faulty access header recognition, data corruption by sending and tracking the package header of each package more precise, therefore reduces the uncertain window of access header check. With above-mentioned features, this invention has less error packets resend over wireless link, and maintain same system functionality using MCU clocked at relative lower frequency. Hence it becomes possible to reduce the area of the silicon implementation, extend standby time when used in mobile device, and save power consumption system wide. Moreover, the present invention is applicable for use in various types of base-band hardware communication architectures or similar architectures.

15 Claims, 3 Drawing Sheets

POWER EFFICIENT FHSS BASE-BAND HARDWARE ARCHITECTURE

BACKGROUND OF THE INVENTION (a) Field of the Invention

The present invention of power efficient FHSS (Frequency Hopping Spreading Spectrum) base-band hardware architecture with sleep mode can perform a higher system-wide calculation in lower power consumption, provide a precise synchronization of system clock to reduce jitter variance of FHSS system less than three clocks of highest system clock and extend communication range under same RF (Radio Frequency) condition of transmission power and receiving sensitivity.

This invention comprises a digital wireless transceiver device, a bi-directional data interface, a clock recovery circuit, a correlator, a MCU (Micro Control Unit), a coder, a timing_event controller, a series-parallel data converter, a DMA (Direct Memory Access) block, a transceiver controller and an oscillation circuit. The clock recovery circuit connecting to the bi-directional data interface extracts frequency and phase being carried within received data, thereby utilizing the recovered clock to latches received data in secure phase locally. The correlator calculates similarity between shifted-in received data from peer and a pre-configured local access address. An Access_Sync signal is generated when the matching-level of similar pattern exceeds preset condition and then is passed to both the MCU as an interruption signal and to the timing_event controller to record timing as a reference of adjustment. A RX_TRIG (receiving-triggered) signal is also generated to notify the series-parallel data converter to launch bulk data collection. The MCU handles data movement around DMA RAM and FHSS function related block in a specific procedure. At receive mode, the timing_event controller receives the Access_Sync interruption signal from the correlator, and the circuit of system clock captures timing information at the moment of interruption as a reference to adjusts local timing to lock with that of entire wireless digital network. At transmission mode, the timing_event controller generates a TX_TRIG signal to notify the series-parallel data converter to launch bulk data transmission. After the series-parallel data converter being activated, it monitors the status of data buffer progress with preset condition and generates a Wake_Int and a Wrap_Int interruption signals. The DMA circuit includes a DMA arbitrator and a RAM block to coordinate data access from both MCU and series-parallel data converter. The coder circuit can perform FEC (Forward Error Correction), CRC (Cyclic Redundant Check) or scramble functions for both receiving and transmitting data optionally. Accordingly, by adopting the invention architecture of the combination of MCU with dedicated function and specific concurrent operation, hardware circuits can utilize relative much lower system clock to provide same functions only provided by a MCU with higher system clock of the prior art. Thereby, by highly integrating with automatic circuit in charge of massive computation duty for FHSS communication in parallel mode, this invention can extend operation time for a portable FHSS system, and allow system to implement voice or image DSP (Digital Signal Processing) function with a low cost MCU, for instance, an 8-bit MCU.

(b) Description of the Prior Art

The prior art related to MCU or DSP of digital wireless communication system tends to drive system operation with function-oriented software. By following the instructions of MCU, the system executes tasks including access code capturing by shifting and analyzing data bit by bit, local system timing synchronization by reading out reference timing of access code received inside interruption routine, high-MIPS algorithm calculation in generic instruction, and series-to-parallel data transmission and collection handing by a every 8-bit interruption routine of series-parallel interface. Comparing to the invention, prior MCU has to utilize system clock with relatively much higher frequency or to keep in burst working states frequently to provide the same level service and functionality. Moreover, a larger scale jitter and less precise local timing is expected because of variant latency of Access_Sync interruption signal driven from complicated MCU interrupt scheduling and possible variant instruction cycle and decision inside interruption routine. The larger scale jitter forces FHSS receiver using a wider valid frame to verify incoming access code. Therefore, it increases the possibility to get faulty access code to degrade synchronization with central wireless network timing, and corrupts the integrity of receiving data. In the worst case, a reliable data link can be broken, and local FHSS system has to rebuild data link from scratch. Finally, the system stability and effective capability of transmission get downgraded, and more power is consumed to finish a same job. Hence, the new invention focuses on power saving and improvement of communication quality for portable speech equipment.

In an actual application, most of 2.4 GHz ISM band Bluetooth transceiver is using 12 MHz as base system clock before PLL (Phase Lock Loop) upgrade it to higher frequency of clock. If the baseband circuit and the digital signal transceiver can share the same clock source of oscillation, then power consumption of the entire system is optimized. However, a MCU operated at 12 MHz is evidently with insufficient computation power, because most base-band for Bluetooth application are still limited to application of small scale system with low transmission capacity, for instance, joy stick, single channel wireless headset and low-rate wireless serial line, and so on. However, the other high-end applications, like multiple channels of audio and video processing, or extra discrete signal processing capability for voice compression and tone detection, have to utilize more proprietary solution in high cost DSP chips. In short, the prior art have to be modified to meet users' requirements in higher level practical use.

SUMMARY OF THE INVENTION

A primary objective of the present invention is to provide a power efficient FHSS (Frequency Hopping Spreading Spectrum) base-band hardware architecture with characteristics of higher performance and ability of system-wide calculation in lower power consumption, precise synchronization of system clock to reduce jitter variance of FHSS system less than three clocks of highest system clock and wider communication range under same RF condition of transmission power and receiving sensitivity.

The invention comprise a digital wireless transceiver device, a bi-directional data interface, a clock recovery circuit (comprising a clock corrector), a correlator (comprising a shift register and an access code comparator), a MCU (Micro Control Unit), a coder, a timing_event controller (comprising a system clock, a timer, a system timing capturing register and a pulse generator for synchronized data transmission), a series-parallel data converter (comprising two event_type monitors, a address pointer, a logic controller and a shift register), a DMA (Direct Memory Access) block (comprising a DMA arbitrator and a RAM (Random Access Memory)), a transceiver controller and an oscillation circuit. The clock recovery circuit connecting to the bi-directional data interface extracts frequency and phase being carried within received data, thereby utilizing the recovered clock to latch received data in secure phase locally. The correlator calculates similarity between shifted-in received data from peer and a pre-configured local access address. An Access_Sync signal is generated when the matching level of similar pattern exceeds preset condition. An Access_Sync signal is passed to the MCU and the timing_event controller as an interruption signal simultaneously. Thereby, by capturing that event-triggered timing of interruption in an automatic control circuit, it reduces jitter of reference point of system clock to a secure scale. This is the major advantage superior to generic instruction driven by software method. A RX_TRIG signal is also generated to notify the series-parallel data converter to launch bulk data collection, every 8-bit data is stored into RAM repeatedly without intervention from MCU. This method is another main advantage better than the MCU of prior art which moves data by frequent routine of interruption. The MCU handles data movement between RAM in DMA block and FHSS function related blocks of this invented hardware architecture in such a specified procedure. At receive mode, the timing_event controller receives the Access_Sync interruption signal from the correlator, and system timing capturing register accepts that timing information at the moment of Interruption as a reference to adjusts local timing. As the hardware architecture can lock interruption signal quite precisely, normally, the timing error of jitter can be lowered to less than three highest system clocks, and it can maintain a more stable wireless digital data link to peer party. Eventually, the performance of data communication of the entire wireless network is improved. The buffering logic controller periodically preempts MCU to DMA arbitrator for storing received data. Such combination of control logic increases overall practicability of the present invention.

Another objective of the present invention is to provide a power efficient FHSS base-band hardware architecture, wherein the series-parallel data converter is configured with two event_type monitors, used to respectively produce a Wake_Int and a Wrap_Int interruption signals, and a address pointer to produce an address index assigned in RAM (Random-Access Memory). The series-parallel data converter and the MCU are also connected to DMA arbitrator and a shared RAM. The DMA arbitrator maintains a specific procedure to access RAM block. The series-parallel data converter, different from the prior art to process data to RAM via the MCU, sends every 8-bit data into the RAM directly without intervention of MCU. Thus, MCU can stay in sleep mode longer. Address pointer serves as a pointer to access RAM block by increasing one integer value of address assigned automatically every time a byte is stored. When address pointer reaches the pre-defined address, depending on actual demand and normal in middle of payload, a Wake_Int is triggered to wake CPU up from sleep mode, and process data in the highest clock to implement one-time bulk FEC processing on the already received data through a parallel bus linked to the RAM. After finishing jobs, MCU may or may not sleep and it's depended on received data progress status. As packet payload receiving comes to the end, a Wrap_Int is triggered and attempts to wake MCU up and deactivate series-parallel data converter. Finally, MCU processes data at the highest clock speed to implement one-time bulk FEC (Forward Error Correction) processing upon the data received and stored. Thereby it substantially increases processing efficiency of the MCU, and thus it has more time to handle other digital voice data, digital signal processing, arithmetic operations or other applications.

Another objective of the present invention is to provide the power efficient FHSS base-band hardware architecture with the bi-directional data interface that is connected to the clock recovery circuit, and is to use the recovered clock to take sampling from received data bit by bit in a secure window, and thus it provides a more reliable timing relation and data integrity between peer systems.

Yet another objective of the present inventions is to provide the power efficient FHSS base-band hardware architecture, wherein the coder circuit which operates reverse function of both encoding (transmission) and decoding (receiving) to work with MCU for CRC (Cyclic Redundant Check), FEC (Forward Error Correction) and scramble functions in the half-duplex system, thereby increasing robustness of data link and security of data transmission of the present invention.

In order to achieve the aforementioned objectives, the FHSS base-band hardware architecture of the present invention, which comprises a digital wireless transceiver device, a bi-directional data interface, a clock recovery circuit, a correlator, a MCU, a coder, a timing_event controller, a series-parallel data converter, a DMA block, a transceiver controller and an oscillation circuit, monitors local system timing and generates a pulse of synchronization upon present system timing to match with a pre-defined timing event. That pulse of synchronization triggers the series-parallel data converter to launch bulk data transmission by reading out preset transmitting data from RAM and moving them into the shift register automatically. After that, the buffering logic controller repeats transferring data from RAM into shift register in 8 bits as a unit after the least significant bit of previous unit is sent. In transmission mode, the series-parallel data converter and the DMA block execute the same set of function, but it's a reverse function to receiving mode. In addition, the MCU still can access RAM at full operating clock in parallel bus to cooperate with the series-parallel data converter. Based on the FHSS base-band hardware architecture and means mentioned above, the present invention can adopt a relative lower clock, and achieve same functionality of what only a higher-clock MCU or DSP of the prior art is able to achieve, thereby substantially improve the effective transmission and processing capability of signals. Furthermore, the present invention is able to lower timing jitter on each transmission data session for a FHSS communication system, reduce MCU burst busy time, extend MCU sleep mode to save power consumption.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
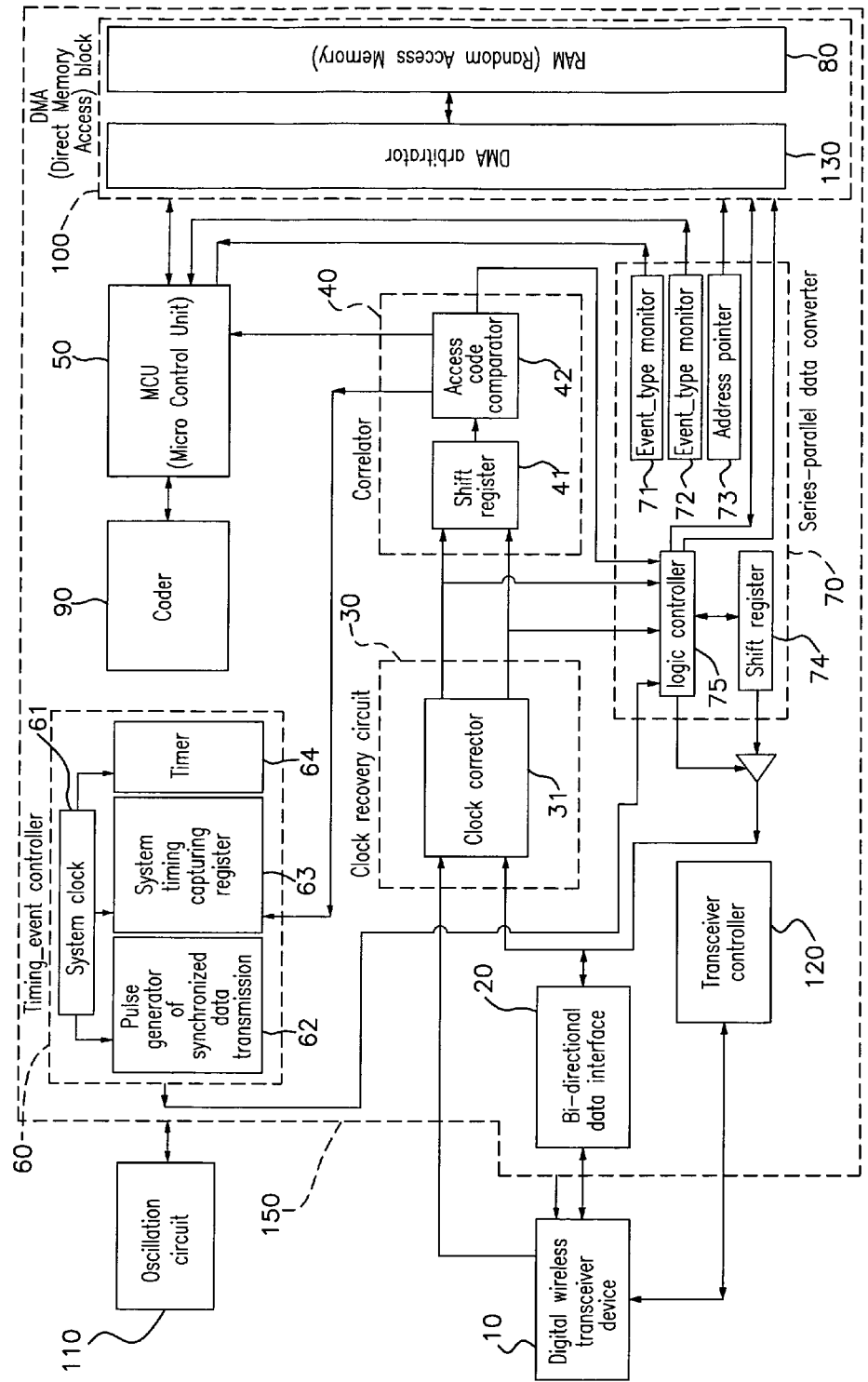
FIG. 1 shows a connected block schematic view of an embodiment of the present invention.
Figure 2:
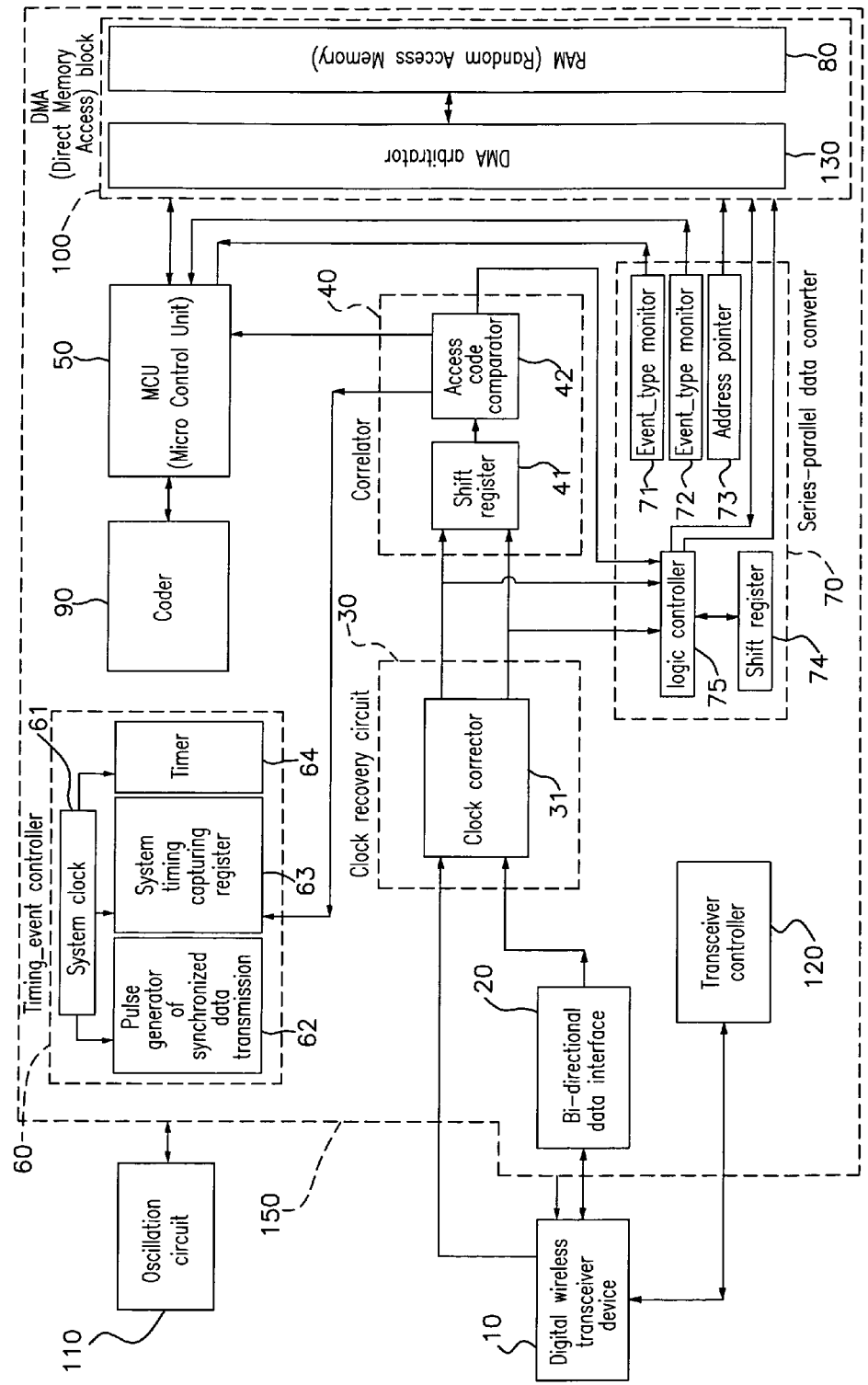
FIG. 2 shows a schematic flow chart depicting the embodiment receiving data path according to the present invention.

Referring to FIG. 1, which shows an embodiment of the present invention, wherein a power efficient FHSS base-band hardware architecture comprises a digital wireless transceiver device 10, a bi-directional data interface 20, a clock recovery circuit 30 (comprising a clock corrector 31), a correlator 40 (comprising a shift register 41 and an access code comparator 42), a MCU (Micro Control Unit) 50, a coder 90, a timing_event controller 60 (comprising a system clock 61, a pulse generator of synchronized data transmission 62, a system timing capturing register 63 and a timer 64), a series-parallel data converter module 70 (comprising two event-type monitors 71, 72, a address pointer 73, a shift register 74 and a logic controller 75), a DMA (Direct Memory Access) block 100 (comprising RAM (Random-Access Memory) 80 and a DMA arbitrator 130), a transceiver controller 120 and an oscillation circuit 110. Meanwhile, above-mentioned bi-directional data interface 20, clock recovery circuit 30, correlator 40, MCU 50, coder 90, a timing_event controller 60, a series-parallel data converter 70, DMA block 100, a transceiver controller 120 are organized as a system module 150. The digital wireless transceiver device 10 enables the reception and transmission of wireless digital signals. The bi-directional data interface 20 is connected to the digital wireless transceiver unit 10, and signals are transmitted by means of the digital wireless transceiver unit 10. The clock recovery circuit 30 is connected to the bi-directional data interface 20. The clock recovery circuit 30 is configured with the clock corrector 31 to enable correcting and synchronizing data and clock characteristics of local and external signals. The access code comparator 42 of the correlator 40 is connected to the clock recovery circuit 30, and embedded the functionality to distinguish whether the shifted-in data from external peer can fit a pre-defined qualification. After completing comparison phase, an Access_Sync interruption signal is produced and passed to the MCU 50 and the system timing capturing register 63 of the timing_event controller 60, where timing information of the Access_Sync interruption signal is triggered by the hardware circuit and a valid captured time is used as a reference for system timing tracking with clock of master peer, thereby improving precision of local system timing synchronization, and preventing capturing errors resulted from wider verification window of system clock, while at the same time avoiding inconsistent interrupt latency of the MCU 50 of prior art due to current executing instructions with different cycles. The access code comparator 42 of the correlator 40 also produces an Rx_Trig (receiving-triggered) signal which notifies the logic controller 75 of the series-parallel data converter 70 to start receiving data from the shift register 74. When shifted-in buffer is full, priority of the DMA arbitrator 130 is seized by series-parallel data converter 70 until shifted-in data has been stored in the RAM 80 according to the addresses assigned by the address pointer 73. When the received data hits a pre-defined level of memory space, then the event_type monitor 71 of the series-parallel data converter 70 timely triggers a Wake_Int to notify the MCU 50 to wake up from sleep state and to implement one-time bulk processing of the received data in the RAM 80. After completing receiving the data, then the event_type monitor 72 of the series-parallel data converter 70 triggers a Wrap_Int to notify the MCU 50 that data receiving phase has come to an end and to execute reading, processing and/or arithmetic operations of data or handling data movement to other auxiliary speech processing units, thereby increasing practicability and functionality of the entire present invention. (See FIG. 2)

The MCU 50 is connected to the correlator 40, the DMA block 100, the coder 90 (the coder 90 implements three functions, including FEC (Forward Error Correction), CRC (Cyclic Redundant Check) and Scramble; wherein prior to transmitting data and after receiving signal data, the MCU 50 is used to transmit data from the RAM 80 to the coder 90, and respectively implements FEC, Scramble or CRC debugging, encryption and decryption functions, thereby increasing data security and system stability of the present invention.) and the series-parallel data converter 70 to control access to data.

(Meanwhile, the correlator 40, comprising a shift register 41 and an access code comparator 42, has the function to compare whether the access codes originated from external received signals has reached a pre-defined criteria. Then, an Access_Sync interruption signal is produced and transmitted to the MCU 50 and the timing_event controller 60. The access code comparator 42 also generates an Rx_Trig which notifies the series-parallel data converter 70 to start receiving data sent from external. The timing_event controller 60 is connected to the correlator 40 and the series-parallel data converter 70, and receives the Access Code_Int transmitted by the access code comparator 42 of the correlator 40, and captures and records the system time when the event of interruption is occurred; at the same time, after time comparison, readjustment enables the clock following end to lock the wireless communication system clock, and, moreover, provides a reference adopted by related auxiliary units and becomes an originating point in time slot of a synchronized time frame. The series-parallel data converter 70 is configured with the two event_type monitors 71, 72 and the data pointer 73 to respectively produce two interrupt signals—the Wake_Int and the Wrap_Int to control the MCU 50, and a data addressing signal which serves as an address index for data storage in the RAM 80. Then, the capturing, processing and arithmetic operation of data is implemented in subsequent time slots.

Figure 3:
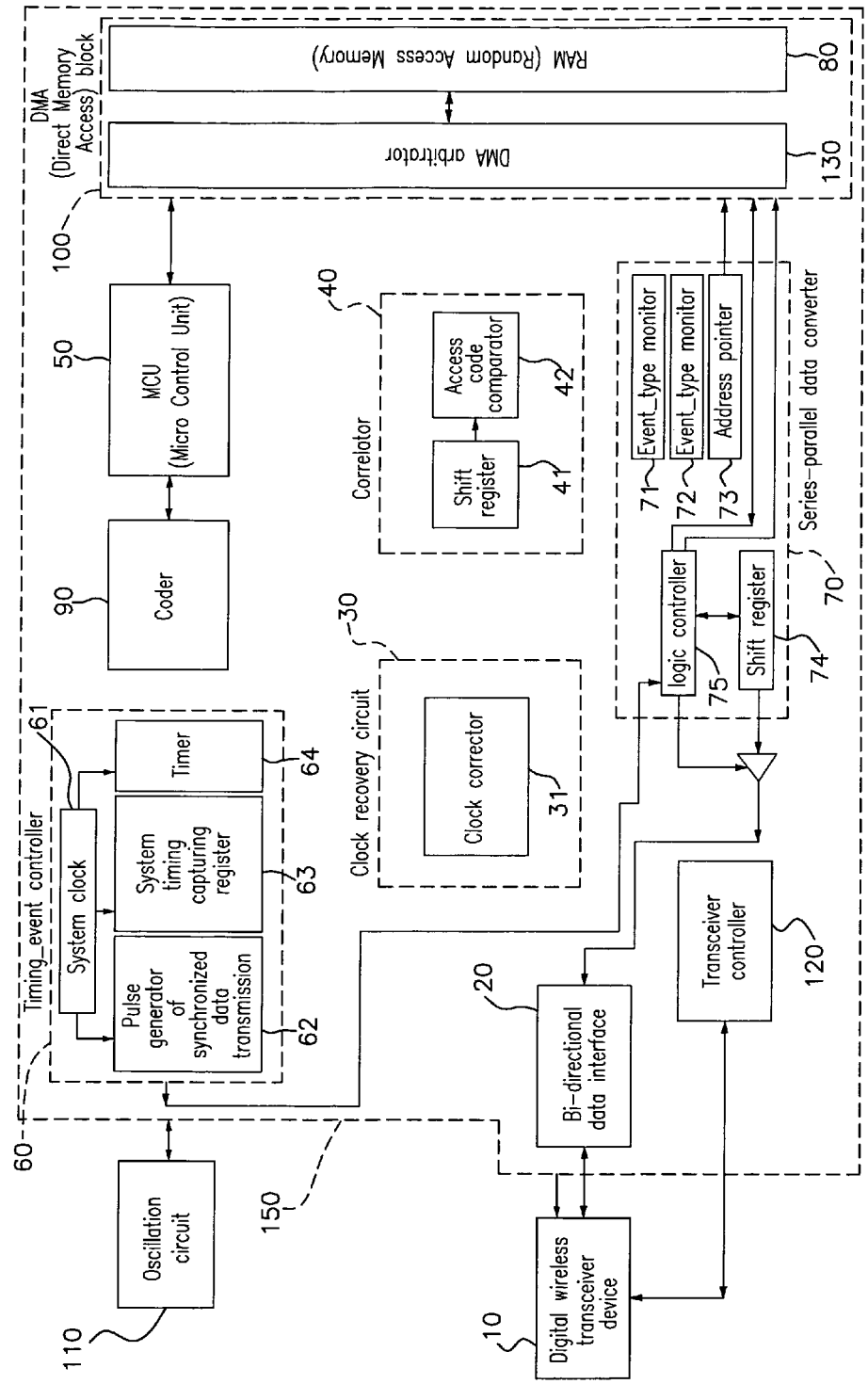
FIG. 3 shows a schematic flow chart depicting the embodiment transmitting data path according to the present invention.

Furthermore, when in a transmitting mode (see FIG. 3), the system time slot is under the program control of the timing_event controller 60, and a synchronized pulse is produced through the pulse generator of synchronized data transmission 62 and is transmitted to the logic controller 75 of the series-parallel data converter 70, where it instructs the logic controller 75 to emit a control signal to the DMA arbitrator 130 to temporarily stop the MCU 50 accessing data from the RAM 80, and the highest clock is adopted to periodically make up and transmit data to the shift register 74 of the series-parallel data converter 70 by means of a parallel bus, whereupon signals are transmitted through the bi-directional data interface 20 and the digital wireless transceiver device 10.

The digital wireless transceiver device 10 is further connected to the transceiver controller 120, in addition, the RAM 80 is further connected to the DMA arbitrator 130, thus, the DMA arbitrator 130 can first connect to the MCU 50 and the data series-parallel converter module 70, which enables signals to be read-in or read-out of the RAM 80 according to a fixed scheduling sequence, thereby facilitating controlling data access. Besides, the clock of system module 150 is supplied by the oscillation circuit 110 and then outputs to the wireless digital signal transceiver. Under such a hardware communication architecture sharing the same clock from oscillation circuit 110, then total power consumption of the system can be reduced.

In short, by adopting the lower-clock MCU 50 and the hardware circuit architecture, the present invention enables achieving functionality of what only a higher-clock MCU 50 of the prior art is able to carry out, therefore substantially enhance the effective transmission and processing capability of signals. Moreover, the present invention is able to provide accurate clock synchronization for a frequency hopping communication system, reduce the probability of error occurring when transmitting and processing digital signals, save on power consumption when the circuits are operating, extend standby interval and achieve transmission of high efficiency base-band digital data packets.

According to the above detailed description, persons familiar with related art are able to easily understand that the present invention can clearly achieve the aforementioned objectives, and evidently complies with the essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A power efficient FHSS (Frequency Hopping Spreading Spectrum) base-band hardware architecture, comprising a digital wireless transceiver, a bi-directional data interface, a clock recovery circuit, a correlator, a MCU (Micro Control Unit), a timing_event controller, a series-parallel data converter, a DMA (Direct Memory Access) block, a coder, a transceiver controller and an oscillation circuit; wherein, the digital wireless transceiver enables receiving of signals; and the bi-directional data interface is connected to the digital wireless transceiver, the clock recovery circuit is connected to the bi-directional data interface to filter out noise on an external receiving signal and recover a sample clock for filtered receiving data, the correlator is connected to the clock recovery circuit, the MCU is connected to the correlator, the DMA block and the coder, the timing_event controller is connected to the correlator, the series-parallel data converter and the oscillation circuit, and the series-parallel data converter is connected to the correlator, the MCU, the timing_event controller and the DMA, thereby enabling the receiving of signals.

2. The power efficient FHSS base-band hardware architecture according to claim 1, wherein the clock recovery circuit is configured with a clock corrector to restore the original sampling clock, and filter out glitches from the original external receiving signal, wherein the filtered receiving data is sampled by the restored clock, and it's then used for other subsequent function devices.

3. The power efficient FHSS base-band hardware architecture according to claim 1, wherein the correlator comprises a shift register and an access code comparator, and the access code comparator determines whether or not the pattern of access codes of incoming data has reached a preset matching-level, after which an Access_Sync interruption signal is produced, and transmitted to the MCU and the timing_event controller simultaneously; the access code comparator also produces a Rx_Trig (receiving-triggered) signal which notifies the series-parallel data converter to start receiving signals transmitting from external party.

4. The power efficient FHSS base-band hardware architecture according to claim 1, wherein the series-parallel data converter is configured with two event_type monitors and an address pointer, which respectively produce two interruption signals: a Wake_Int and a Wrap_Int, as well as a data addressing signal; the series-parallel data converter is joined to RAM (Random Access Memory) which is shared with the MCU.

5. The power efficient FHSS base-band hardware architecture according to claim 1, wherein the digital wireless transceiver device is further connected to the transceiver controller to control behavior of radio frequency electric characteristic of receiving subsystem.

6. The power efficient FHSS base-band hardware architecture according to claim 1, wherein the DMA block comprises a RAM and a DMA arbitrator to coordinate data in or out RAM in a predefined access priority between MCU and the series-parallel data converter.

7. The power efficient FHSS base-band hardware architecture according to claim 1, wherein the series-parallel data converter is internally configured with a logic controller to store receiving data by preset configured scheduling and sequence condition.

8. The power efficient FHSS base-band hardware architecture according to claim 1, wherein the timing_event controller is configured with a timing capture register, which captures and records local machine time when an access code comparator is producing interruption signals, and the captured time is referenced for local machine to fine tune local machine clock and precisely adjust its FHSS frame aliment pulse to a proper time point by related auxiliary units.

9. The power efficient FHSS base-band hardware architecture according to claim 1, the coder connected to the MCU (Micro Control Unit), implements CRC (Cyclic Redundant Check), debugging, and decryption functions toward data received and stored in RAM.

10. A power efficient FHSS base-band hardware architecture, comprising a digital wireless transceiver device, a bi-directional data interface, a clock recovery circuit, a correlator, a MCU (Micro Control Unit), a timing_event controller, a series-parallel data converter, a DMA (Direct Memory Access) block, a coder, a transceiver controller and an oscillation circuit; wherein, the digital wireless transceiver device enables transmission of signals; the bi-directional data interface is connected to the digital wireless transceiver device; the clock recovery circuit is connected to the bi-directional data interface to filter out noise on an external receiving signal and recover a sample clock to sample filtered signal, the correlator is connected to the clock recovery circuit, the MCU is connected to the correlator, the DMA block and the coder to make up data to a RAM through a parallel bus by a highest MCU operating clock without wait state, the timing_event controller is connected to the correlator, the series-parallel data converter and the oscillation circuit, and the series-parallel data converter is connected to the correlator, the MCU, the timing_event controller and the DMA block, thereby enabling the transmission of signals.

11. The power efficient FHSS base-band hardware architecture according to claim 10, wherein the digital wireless transceiver device is further connected to the transceiver controller to control behavior of radio frequency electric characteristic of transmission subsystem.

12. The power efficient FHSS base-band hardware architecture according to claim 10, wherein the DMA block comprises the RAM and a DMA arbitrator.

13. The power efficient FHSS base-band hardware architecture according to claim 10, wherein the timing_event controller is internally configured with a pulse generator of synchronized data transmission to notify the series-parallel data converter to launch bulk data transmission at preset specific local machine time.

14. The power efficient FHSS base-band hardware architecture according to claim 10, wherein the series-parallel data converter is internally configured with a logic controller to transmit data out by preset configured scheduling and sequence condition.

15. The power efficient FHSS base-band hardware architecture according to claim 10, the coder connected to the MCU (Micro Control Unit), implements FEC (Forward Error Correction) or scramble functions on data ready to be transmitted.

* * * * *